(12) United States Patent
Chastain et al.

(10) Patent No.: US 6,502,022 B1
(45) Date of Patent: Dec. 31, 2002

(54) METHOD AND SYSTEM FOR PREVENTING UNSAFE COMMUNICATION DEVICE USAGE IN A VEHICLE

(75) Inventors: Alicia A. Chastain, Raleigh, NC (US); Michael A. Paolini, Round Rock, TX (US); David M. Wendt, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/714,735

(22) Filed: Nov. 16, 2000

(51) Int. Cl.[7] ................................................ G06F 17/00
(52) U.S. Cl. ........................................................ 701/36
(58) Field of Search .............................. 701/36, 45, 207

(56) References Cited

U.S. PATENT DOCUMENTS

| | | | |
|---|---|---|---|
| 5,301,227 A | | 4/1994 | Kamei et al. |
| 5,353,411 A | | 10/1994 | Nakaosa et al. |
| 5,367,686 A | | 11/1994 | Fisher et al. |
| 5,453,929 A | * | 9/1995 | Stove ........................ 340/571 |
| 5,471,389 A | * | 11/1995 | Hahlganss .................. 341/176 |
| 5,613,125 A | | 3/1997 | Nguyen et al. |
| 5,890,084 A | | 3/1999 | Halasz et al. |
| 5,978,737 A | * | 11/1999 | Pawlowski et al. ......... 180/271 |
| 6,029,110 A | * | 2/2000 | Zuber et al. .................... 701/1 |
| 6,256,558 B1 | * | 7/2001 | Sugiura et al. .............. 340/529 |
| 6,262,657 B1 | * | 7/2001 | Okuda et al. ................ 340/438 |

FOREIGN PATENT DOCUMENTS

| | | |
|---|---|---|
| JP | 56-110356 A | 1/1981 |
| JP | 57-160234 A | 2/1982 |
| JP | 08162864 | 1/1998 |
| JP | 09025357 | 8/1998 |
| JP | 09049468 | 9/1998 |
| JP | 09120794 | 11/1998 |
| JP | 09272712 | 4/1999 |
| JP | 10110740 | 11/1999 |
| JP | 10164148 | 12/1999 |
| WO | WO 97/49571 | 12/1997 |

* cited by examiner

*Primary Examiner*—Michael J. Zanelli
(74) *Attorney, Agent, or Firm*—Frank C. Nicholas; Marilyn Smith Dawkins

(57) ABSTRACT

A method and system for controlling use of a communication device in a vehicle is provided. The system includes a plurality of internal vehicle sensors, the vehicle sensors adapted to provide internal information. A receiver is provided adapted to receive external information from an external source and a controller is provided adapted to receive the internal information and the external information. The controller is adapted to assign a risk value to each of the internal and external information and compare the assigned risk values to a predetermined risk threshold and is adapted to disable the communication device when any of the risk values exceeds the predetermined risk threshold.

10 Claims, 3 Drawing Sheets

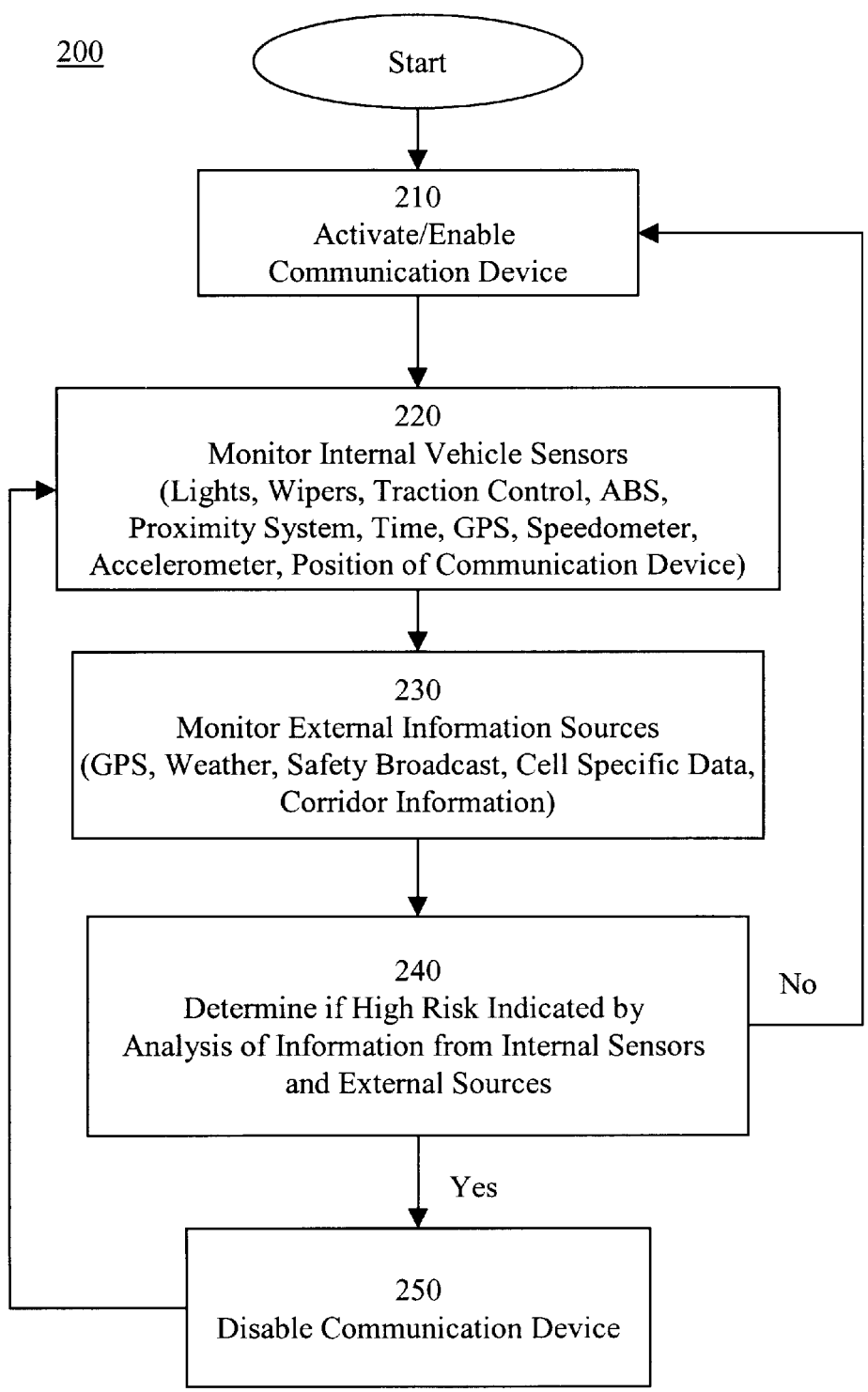

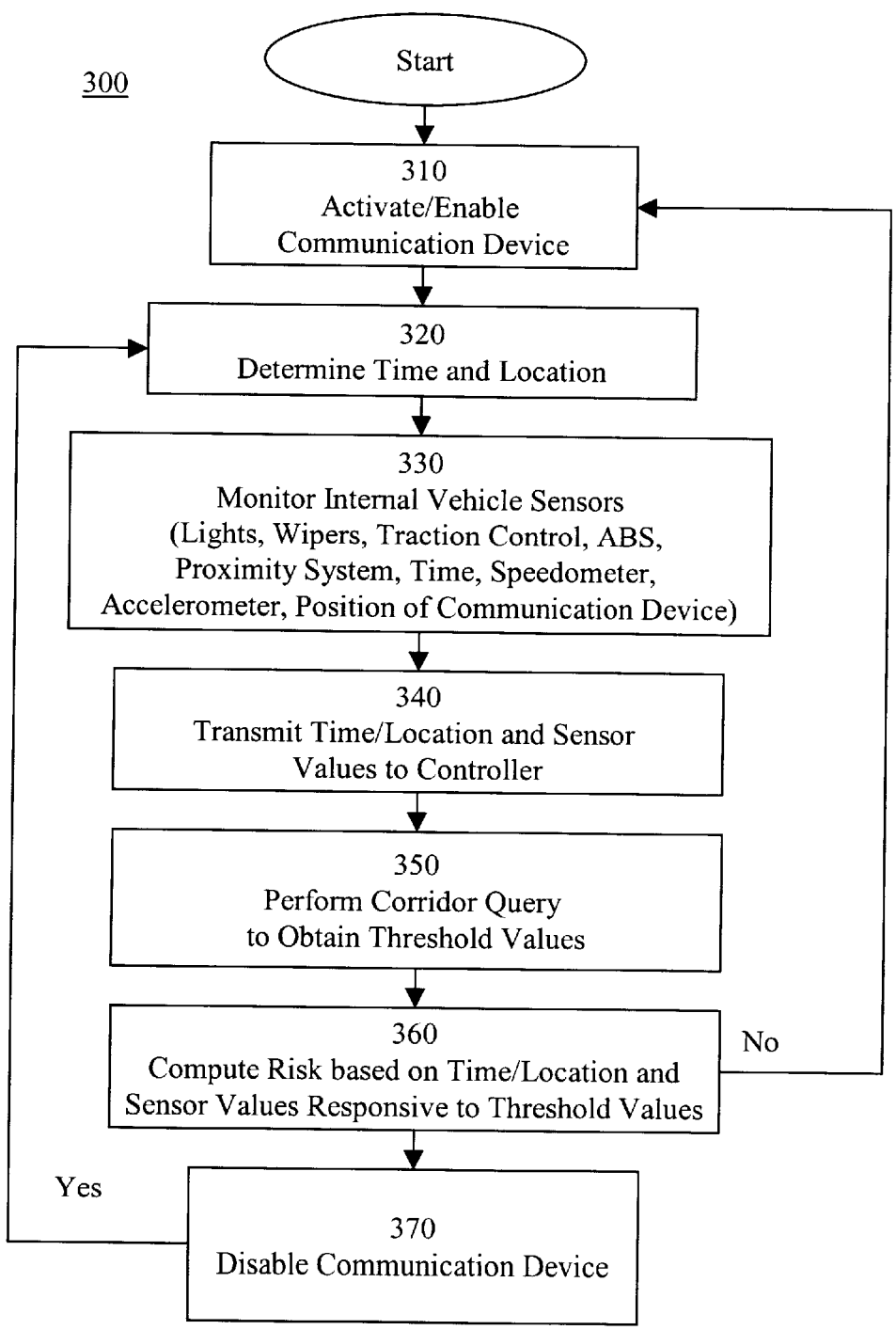

METHOD AND SYSTEM FOR PREVENTING UNSAFE COMMUNICATION DEVICE USAGE IN A VEHICLE

BACKGROUND OF THE INVENTION

Cellular communication has brought about a wealth of devices suitable for use in vehicles. With the recently emerging use of cars as mobile offices and communication nodes, there has been a measurable increase in auto accidents caused by the diversion of the driver's attention while using the communication device. Prior art technologies have provided methods used for disabling communication devices in response to a number of specific vehicle conditions. For example, in the event a vehicle's velocity or acceleration exceeds a predetermined threshold, a controller suspends the reception or transmission of signals by the communication device. In other methods, a rapid change in the direction of travel triggers the suspension of signals to or from the communication device. These methods utilize acceleration and speed detection by sensors in the vehicle, rapid direction change detection, and acute angle vehicle changes to predict that a driver is in a relatively higher risk of being placed in an unsafe driving condition by being distracted by a wireless communication. However, these techniques do not account for a variety of other unsafe conditions or only generally relate to actual vehicle driving conditions. Further, these techniques do not account for local or regional controls which are put into place through legislation, or the like, regarding usage of communication devices in vehicles.

For example, some driving conditions not detectable by vehicle motion sensors include weather conditions, the time of day, the available light, traffic density, vehicle traction, presence of designated "restricted use corridors", authorized safety personnel and so on.

It would be desirable to have an improved system for accurately detecting unsafe driving conditions and preventing use of a communication device when unsafe conditions are determined to be present.

FIELD OF THE INVENTION

The invention relates to the use of wireless communication devices in moving vehicles. In particular, the invention relates to a system and method of stopping use of communication devices in moving vehicles when unsafe conditions are present.

SUMMARY OF THE INVENTION

A method for controlling use of a communication device in a vehicle is provided. The method includes setting the communication device to an enabled state at startup of the vehicle. Internal risk values are monitored that are calculated from internal information associated with at least one internal vehicle sensor. External risk values are monitored that are calculated from external information associated with at least one external information source. The internal and external risk values are compared to a predetermined risk threshold. The communication device is disabled when any of the internal and external risk values exceeds the predetermined risk threshold.

Another embodiment of the present invention contemplates computer readable code and/or hardware to execute these steps as set forth in the above paragraph.

In alternate embodiments, the communication device is disabled when any single risk value exceeds the predetermined threshold or any combination of the internal and/or external risk values exceeds the predetermined threshold.

The internal sensors can provide internal information from a headlight system, a wiper system, a traction-control system, an ABS, a vehicle proximity system, a speedometer, an accelerometer, and a position of the communication device. The external information can include weather information, GPS information, safety information, corridor information, and time information. The corridor information may include any combination of external information and may include time and location.

In another embodiment, the communication device can include an override switch that manually enables the communication device to be enabled regardless of driving conditions.

In another embodiment, the method for controlling use of a communication device in a restricted use corridor includes determining a current location of the vehicle, determining whether the current location of the vehicle falls within the corridor and disabling the communication device when it is determined that the current location of the vehicle falls within the corridor.

In yet another embodiment, the method for controlling use of a communication device in a restricted use corridor includes determining a current time of day, determining whether the current time of day falls within a restricted use time period of the corridor and disabling the communication device when it is determined that the current location falls within the corridor and the current time falls within the restricted use time period of the corridor.

Another embodiment of the present invention contemplates limiting the time of use of the communication device to a predetermined time period.

Another embodiment of the present invention includes a method for controlling use of a communication device in a vehicle including setting the communication device to an enabled state at startup of the vehicle. A current time and location of the vehicle is determined. Internal risk values are monitored that are calculated from internal information associated with at least one internal vehicle sensor. External risk values are monitored that are calculated from external information associated with at least one external information source. The current time, location, and internal and external risk values are transmitted to a controller. A corridor query is performed to obtain a corridor risk threshold. The internal and external risk values are compared to the corridor risk threshold. The communication device is disabled when any of the internal and external risk values exceeds the corridor risk threshold.

Another embodiment of the invention contemplates computer readable code and/or hardware to execute the steps of controlling use of a communication device in a vehicle as set forth in the above paragraph.

The present invention provides a system for controlling use of a communication device in a vehicle including a plurality of internal vehicle sensors, the vehicle sensors adapted to provide internal information. A receiver is adapted to receive external information from an external source and a controller is adapted to receive the internal information and the external information. The controller is adapted to assign a risk value to each of the internal and external information and compare the assigned risk values to a predetermined risk threshold and is further adapted to disable the communication device when any of the risk values exceeds the predetermined risk threshold.

In another embodiment of the present system the internal information includes information from at least one of the vehicle headlights, wipers, traction control system, ABS, proximity system, speedometer, clock and accelerometer. The external information includes at least one of position, road condition, weather, safety and corridor information.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWINGS

FIG. 2 is a flow diagram of one embodiment of a routine for preventing unsafe wireless usage in a vehicle; and FIG. 3 is a flow diagram of another embodiment of a routine for preventing unsafe wireless usage in a vehicle.

DETAILED DESCRIPTION

Figure 1:
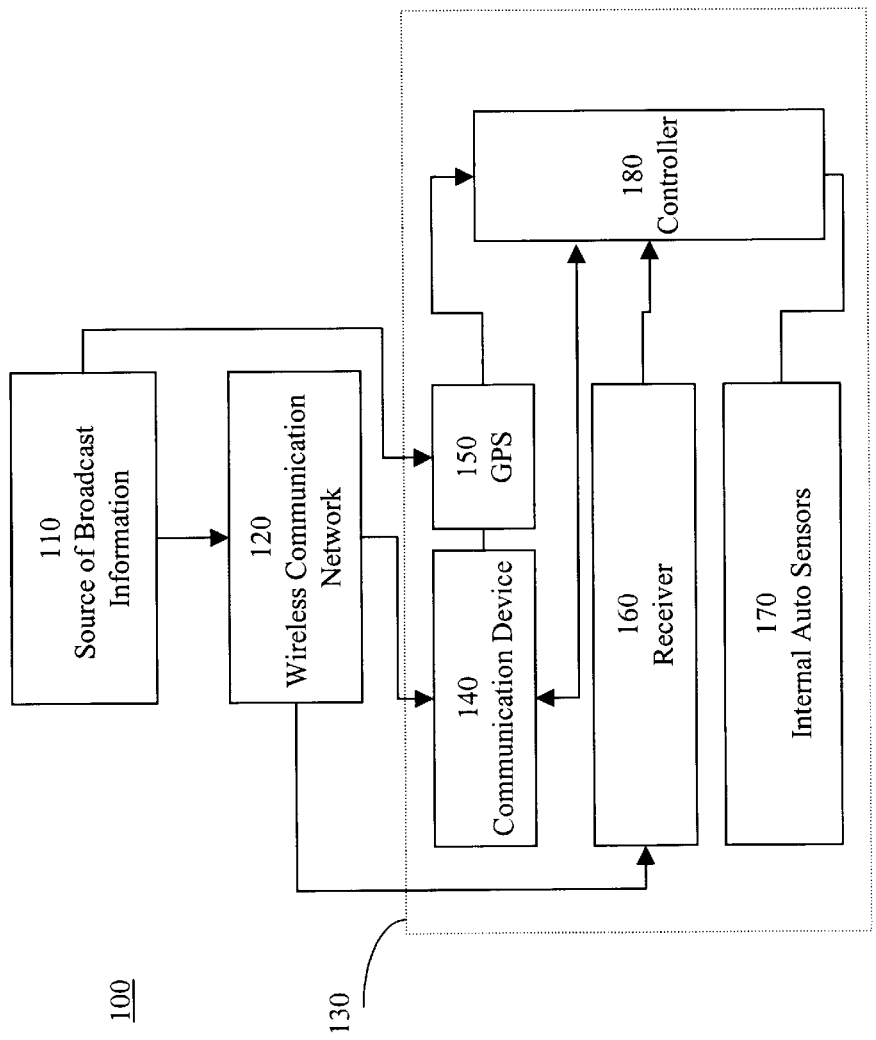
FIG. 1 is a block diagram of one embodiment of a system for preventing unsafe wireless usage in a vehicle.

Referring to FIG. 1, one embodiment of a system for preventing unsafe wireless usage is generally shown at 100. In the embodiment shown in FIG. 1, the system can include a source of broadcast information 110. The source may include one or more radio stations, cellular communication nodes, safety communication nodes, wireless communication nodes, regional communication nodes, Department of Transportation systems, and other communication sources that are adapted to transmit information related to weather, traffic, driving conditions, "restricted use corridors" and the like. The source of information 110 may include satellite transmissions related to the above or may include transmissions including GPS data and other location information. The transmissions may be in the form of text, numerical values or data, audible information, graphic information and the like. In general, the system 100 is adapted to use the information from the source 110 in determining whether it is appropriate to enable or disable a communication device 140 in a vehicle 130.

The source of information 110 may include standardized transmissions adapted to communicate one or more of weather conditions, road conditions, visibility conditions and so on. These standardized transmissions may be Internet-based weather reports that include text-based, or other data that provides the system 100 with information or values that represent the condition of the weather, for example, or other driving conditions. Also, the source of information 110 may include transmissions providing location information to the communication device 140 or a receiving unit 160 or may include location information defining location parameters where use of communication devices 140 is not permitted, i.e., a "restricted use corridor." Information from an external source 110 can include triangulation coordinates to determine a vehicle's exact location, transmitted warnings of weather conditions, hazardous location and "restricted use corridor" enforcement data in a cell sector, and warnings from authorized safety personnel or agencies.

The information from source 110 may be transmitted by way of a wireless communication network 120. The communication networks can include, but are not limited to the Internet, a telephone network, (e.g., a Public Switched Telephone Network (PSTN), private telephone networks, and so on), a cellular network, satellite networks, a personal communication system, a TV network (e.g., a cable TV system), local, regional, national or global paging networks, a wireless data network (e.g., satellite data or local wireless data networks), a wireless LAN, a wireless local loop/distribution system (e.g., LMDS, MMDS or Code Division Multiple Access (CDMA) based system), a Voice Over Internet Protocol (VOIP) network, or any other suitable network. The communication network 120 can also include a wide area network (WAN), such as, for example, the Internet, the World Wide Web (WWW) or any other similar on-line service. It will be recognized that the communication network 120 may have portions in common, may comprise a number of separate networks, or may be the same network.

In one embodiment, the information from source 110, through network 120, can be received by various elements in vehicle 130. Vehicle 130 may include a communication device 140, GPS 140 (or the like), receiver 160, internal auto sensors 170, any one or more of which can be in communication with controller 180. In the alternate, the information from source 110 may be provided to a controller 180 remotely located from the vehicle 130 in a computer server, for example. Receiver 160 may be a portion of controller 180 or a separate unit adapted to receive data from source 110 through wireless network 120. Receiver 160 may also be a receiver portion of communication device 140. Receiver 160 may comprise a receiver portion of a dedicated channel or data channel in communication device 140 that is separate from a voice channel. In this manner, the system 100 is able to both receive and transmit information.

The vehicle 130 includes communication device 140 connected to controller 180. A "communication device" can be any electronic device, tool, or system that might divert a driver's attention from the road during use and thus increase the likelihood of an accident. The communication devices can include, but are not limited to, navigation devices, telamatic units, cellular or wireless telephones, mobile telephones, paging units, radio units, wireless data devices, Web telephones, portable telephones, personal information managers (PIMs), personal digital assistants (PDAs), personal computers (PCs), portable televisions (TVs), Internet TVs, Internet telephones, portable wireless devices (i.e., two-way pagers), portable or installed stereo systems, MP3 players, electronic books, security systems (both mobile and premises-based), or any other suitable communication devices. The communication device 140 can include a pair of communication channels. In one embodiment of the invention, driving condition information 110 may be received by means of one of the two channels.

A GPS 150 may be included to provide location information to controller 180. The GPS 150 may be included as part of communication device 140, may be a stand-alone unit in communication with the controller 180, may comprise a portion of the controller or GPS information from a remote source may be provided by other known methods. The GPS 150 or like device provides location information regarding the communication device 140 in a form which may be transmitted, stored, analyzed and so on.

Internal sources of information, shown generally at block 170, can include various sensors located within the vehicle itself including a location-determining sensor, a windshield wiper sensor, and a headlight sensor, a speed sensor, an acceleration sensor and a communication device position sensor. Further sources of internal information can include data from a traction control device, a braking system, suspension settings, wheel drive settings, an ABS device, seat belt sensors and a clock. It should be understood that any known method of deriving data from the internal sources is contemplated such as monitoring or measuring electrical flow to and from various aspects of the vehicle, and so on. The sensors may be located in the vehicle or integrated into the communication device or elsewhere. Further, sensors may be used to monitor the condition of the driver, e.g., alert, breathing rapidly and the like.

In addition, a risk value may be assigned to the use of a hand-held communication device verses a hands-free device or a device that requires relatively more or less attention from the user, such as a device with a GUI.

The controller 180 includes at least a CPU, computer enacted code, and memory (not shown). The controller 180 may be located either within the communication device itself, in a cradle portion designed to hold the communication device, or anywhere onboard an associated vehicle. The controller 180 may also be remotely located and in communication with the communication device and the sensors 170. In this manner, the controller 180 may include more processing power and may be used to retrofit older communication devices with capabilities not possible, since the older devices may lack the storage or the like. The controller 180 is adapted to be in communication with the communication device 140 and is furthermore adapted to receive signals from a number of different devices or sources of information. The devices and/or sources of information may be internal to the vehicle or external to the vehicle or a combination of both. Generally, the controller 180 is adapted to receive, analyze, and store location and road condition information from the external and internal information sources 110, 150, and 170. Generally, in operation, the controller 180 can receive information from the internal sensors 170 and external source 110. Using the information thus received, the controller 180 can determine whether the use of the communication device 140 should be restricted. The controller 180 can disable incoming and outgoing transmissions when it is determined that use of the communication device 140 should be restricted.

In an alternate embodiment, the determination to disable the communication device 140 may be overruled by a user or passenger by an override switch (not shown) or the like. In yet another embodiment, the controller 180 may use a communication device position sensor to determine that a passenger is using the communication device 140. In this instance, even when the controller 180 determines that the car is in a potentially hazardous driving condition the communication device is permitted to remain in an operative state.

Referring to FIG. 2, and referring to the elements described in FIG. 1, one embodiment of a routine for reducing or preventing unsafe usage of a communication device 140 is provided at 200.

In block 210, the controller 180 is activated when the car is activated and begins to monitor driving conditions and so on, by receiving external signals and signals from sensors in an associated vehicle 130. Initially the controller 180 activates or enables reception and transmission of information via the communication device 140. In block 220, the controller 180 continually monitors internal vehicle sensors 170. As discussed above, the internal sensors 170 may transmit data from the lights, wipers, traction control system, antilock braking system (ABS), proximity system, clock, speedometer, accelerometer, and a communication device position sensor. The data may be in the form of numerical data or convertible to data that represents risk values. Similarly, a GPS 150 may provide location information of the communication device 140. The GPS 150 may be located in the phone, the car or otherwise associated with the vehicle.

Similarly, in block 230, the controller 180 continually monitors external information sources 110. The external sources 110 can include GPS signals, weather signals, safety broadcasts, and cell-specific or corridor information. The information may be data in the form of numerical data or may be convertible to numerical data representing risk values.

In block 240, the controller 180 determines whether values from any of the sensors or sources of information indicate a predetermined condition consistent with an increased driving risk. The determination may be in the form of a comparison of the obtained risk values with predetermined or real-time risk threshold values. In the event that no determination is made of high driving risk, the system performs a check to ensure continued activation of the communication device 210 and continues to monitor vehicle sensors 220 and external information sources 230.

In the event, that a high driving risk is ascertained, the communication device 140 is disabled 250. The system continues to monitor vehicle sensors 220 and external information sources 230 until such a time that the system determines that the driving risk has reached a state where the device 140 may be activated.

In FIG. 3, another embodiment of the method of the present invention is provided at 300. In block 310, the communication device 140 is enabled. The system 100 determines the current time and location (block 320) of the communication device 140 using a location device such as a GPS 150. Any number of methods or devices may be to used to determine the vehicle location. In one embodiment, wireless signals received by the communication device 140 are used to find the vehicle location. Data sources used to determine a vehicle location could include signals from cell towers, a GPS unit, vehicle motion sensors, or any other reliable location source. The signals are used to calculate, by known methods, the location of the vehicle. The vehicle location thus determined may be stored in the controller 150 for use.

In block 330, the controller 180 continually monitors internal vehicle sensors 170. As discussed above, the internal sensors 170 may provide data from the lights, wipers, traction control system, antilock braking system (ABS), proximity system, clock, speedometer, accelerometer, and a communication device position sensor. The data thus gathered can be stored, analyzed and/or may be transmitted as numerical values that represent safety risk. Accordingly, the risk values are available for a later step, i.e., a comparison to values that represent default, predetermined or real time safety thresholds by a controller 180 or a computer system or the like. An action, responsive to the determination, can then be made, i.e., enabling or disabling the is communication device 140.

In block 340, the time and location values and the risk values are transmitted to the controller 180. The controller 180 may be located in any of the communication device 140, the vehicle 130, or a remote location (not shown). The transmission of the acquired data can occur by any known method in the art.

In block 350, a query of external sources of information is performed to determine if information is available regarding weather, road conditions and other location specific data. In one embodiment, the communication device 140 monitors appropriate frequencies and performs the query when a signal is detected. The communication device 140 receives the information including weather information, driving conditions and corridor-specific information. The information may be in a form which the controller 180 may convert to threshold values or may include numeric threshold values in addition to text, voice and graphic data. In another embodiment, a remote server detects when a communication device 140 enters into broadcast range and provides threshold values regarding weather, driving conditions and corridor-specific information such as "restricted use times" and "restricted use locations".

In some instances, a plurality of values will be needed to trigger a high-risk state. In another words, a single elevated value may not meet or exceed the required safety threshold. Some geographically defined corridors may require a combination of elevated values or a particular additional elevated value to become a high-risk, or safety threat. For example, a particular corridor (or defined geographical area) may only require the disabling of communication devices during rush hour times. In this manner, the values assigned to rush hour times, in a corridor thus designated, would be higher than non-rush hour times. Only in combination with the specific time-based risk factor does the corridor become a "restricted use corridor".

Other value combinations may exceed safety thresholds. If a vehicle's current location falls within in a specified "restricted use phone" corridor, a check may be performed against a "restricted use phone corridor" database which is stored in the controller 180 to see under what conditions the specified "restricted use phone corridor" is enforced. These enforcement conditions may include specified time ranges (during the current morning or evening rush hour, or at night), and can also include weather conditions. If weather, as well as time, is included in the enforcement specification for this "restricted use corridor", a check may be performed to determine the status of current weather. The controller's weather check can include a number of sources of information. Examples of sources of data might include a vehicle's windshield wipers, a vehicle's headlights, and a vehicle's traction control circuitry, and a proximity system. If both the current time and weather match the specified conditions under which this "restricted use phone corridor" is enforced, a disabling signal is sent to the communication device (block 370).

The controller 180 can also receive warning signals from authorized safety personnel and agencies (an accident, bad weather, heavy traffic, etc.). These wireless safety warnings can contain location as well as time specifications and may include messages to be relayed to the user, regarding specific information related to the warning. If a vehicle's current location falls within the warning signal's location parameters (block 360), the time of the warning signal is compared with the vehicle clock. If the current time and vehicle location both match the parameters or specifications in the signal from authorized safety personnel, a disabling signal is sent to the communication device (block 290).

In block 360, a determination can be made to enable or disable the communication device 140 based on time/location information and optionally, sensor values by computing whether the provided risk values meet or exceed the predetermined or provided threshold values. If the system ascertains that the vehicle is in a high-risk state (block 370), the system attempts to disable the communication device 140. If the system ascertains that the vehicle is not in a high-risk state the system does not disable the communication device 140, updates the time and location information (block 320), continues to monitor the sensors (block 330), and so on.

As a vehicle travels from one cellular sector into another, a new set of high-risk location coordinates can be loaded into the controller 180. This information can include the time and/or weather enforcement specifications for associated corridors, as well as each corridor location. The new information also includes hazardous locations that might be interstate highways and high traffic streets. The new information regarding unsafe locations can be loaded into a vehicle's controller 180.

A vehicle's controller 180 has access to weather information. This weather information may contain information for all cell sectors close to a vehicle's current location, and can be constantly being updated as the vehicle travels. This can provide weather feedback to the user, especially one who relies heavily on wireless communication devices, to plan when and where to travel during volatile weather conditions so these people can reduce the chance of wireless communication cutoff.

The controller's weather database may be constantly updated to all current weather conditions and forecasts. All weather information is collected via wireless signals from a cell tower, satellite, and/or any other reliable information source. Any weather information signals are used to continually update the controller's weather database.

During a time when the communication device receives a disabling signal for any of these many safety reasons, the driver, and the person the driver has been speaking with, are both informed of the reason for no longer being able to communicate by a pre-recorded message. If the communication device is currently not in use, all incoming calls are also given a message explaining why the driver cannot be reached at this time and given the option to record a message by a voice mail system. If the driver picks up the communication device and attempts any call, the driver is provided a message explaining why wireless communication is not possible at this time.

It will be understood from the foregoing description that various modifications and changes may be made in the preferred embodiment of the present invention without departing from its true spirit. It is intended that this description be for purposes of illustration only and should not be construed in a limiting sense. The scope of this invention should be limited only by the language of the following claims.

We claim:

1. A method for controlling use of a communication device in a vehicle comprising:

setting the communication device to an enabled state at startup of the vehicle;

monitoring internal risk values calculated from internal information associated with at least one internal vehicle sensor;

monitoring external risk values calculated from external information associated with at least one external information source;

comparing the internal and external risk values to a predetermined risk threshold; and disabling the communication device when any of the internal and external risk values exceeds the predetermined risk threshold;

wherein the external information includes at least one of weather information, GPS information, safety information, and corridor information; and wherein the corridor information includes time information.

2. A method for controlling use of a communication device in a vehicle comprising:

setting the communication device to an enabled state at startup of the vehicle;

monitoring internal risk values calculated from internal information associated with at least one internal vehicle sensor;

monitoring external risk values calculated from external information associated with at least one external information source;

comparing the internal and external risk values to a predetermined risk threshold; and disabling the communication device when any of the internal and external risk values exceeds the predetermined risk threshold;

wherein the external information includes at least one of weather information, GPS information, safety information, and corridor information; and wherein the corridor information includes location information.

3. A method for controlling use of a communication device in a vehicle comprising:

setting the communication device to an enabled state at startup of the vehicle;

monitoring internal risk values calculated from internal information associated with at least one internal vehicle sensor;

monitoring external risk values calculated from external information associated with at least one external information source;

comparing the internal and external risk values to a predetermined risk threshold; and disabling the communication device when any of the internal and external risk values exceeds the predetermined risk threshold;

wherein the communication device comprises a device for receiving messages from a caller, and the method further comprises transmitting a "device busy" message to the caller when the communication device is in a disabled state.

4. A method for controlling the use of a communication device in a restricted use corridor comprising:

setting the communication device to an enabled state at startup of the vehicle;

monitoring internal risk values calculated from internal information associated with at least one internal vehicle sensor;

monitoring external risk values calculated from external information associated with at least one external information source;

comparing the internal and external risk values to a predetermined risk threshold;

disabling the communication device when any of the internal and external risk values exceeds the predetermined risk threshold;

determining a current location of the vehicle;

determining whether the current location of the vehicle falls within the corridor; and disabling the communication device when it is determined that the current location of the vehicle falls within the corridor.

5. The method of claim 4 further comprising:

determining a current time of the vehicle;

determining whether the current time of the vehicle falls within a restricted use time period of the corridor; and disabling the communication device when it is determined that the current location falls within the corridor and the current time falls within the restricted use time period of the corridor.

6. A method for controlling use of a communication device in a vehicle comprising:

setting the communication device to an enabled state at startup of the vehicle;

determining a current time and location of the vehicle;

monitoring internal risk values calculated from internal information associated with at least one internal vehicle sensor;

monitoring external risk values calculated from external information associated with at least one external information source;

transmitting the current time, location, and internal and external risk values to a controller;

performing a corridor query to obtain a corridor risk threshold;

comparing the internal and external risk values to the corridor risk threshold; and disabling the communication device when any of the internal and external risk values exceeds the corridor risk threshold.

7. The method of claim 6 wherein any combinations of internal risk values is compared to the corridor risk threshold.

8. The method of claim 6 wherein any combinations of external risk values is compared to the corridor risk threshold.

9. The method of claim 6 wherein any combination of internal and external risk values is compared to the corridor risk threshold.

10. A computer readable storage medium which contains program code for controlling use of a communication device in a vehicle, said program code comprising:

computer readable program code to set the communication device to an enabled state at startup of the vehicle;

computer readable program code to determine a current time and location of the vehicle;

computer readable program code to monitor internal risk values calculated from internal information associated with at least one internal vehicle sensor;

computer readable program code to monitor external risk values calculated from external information associated with at least one external information source;

computer readable program code to transmit the current time, location, and internal and external risk values to a controller;

computer readable program code to perform a corridor query to obtain a corridor risk threshold;

computer readable program code to compare the internal and external risk values to the corridor risk threshold; and computer readable program code to disable the communication device when any of the internal and external risk values exceeds the corridor risk threshold.

* * * * *

UNITED STATES PATENT AND TRADEMARK OFFICE
CERTIFICATE OF CORRECTION

PATENT NO. : 6,502,022 B1
DATED : December 31, 2002
INVENTOR(S) : Chastain et al.

It is certified that error appears in the above-identified patent and that said Letters Patent is hereby corrected as shown below:

Column 5,
Line 7, replace the word "verses" with -- versus --

Signed and Sealed this

Thirtieth Day of September, 2003

JAMES E. ROGAN
*Director of the United States Patent and Trademark Office*